July 31, 1951 C. R. WILLIAMS 2,562,516
THREADED FASTENER
Filed Dec. 7, 1945
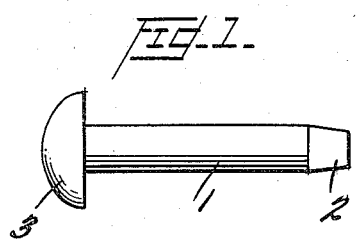
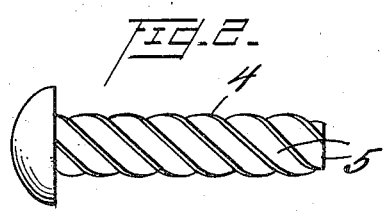
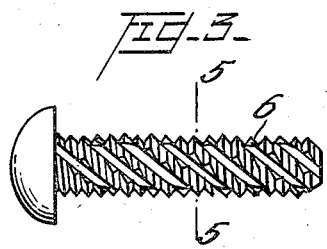
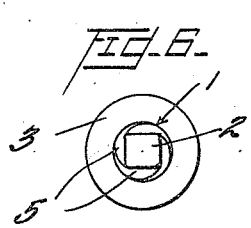
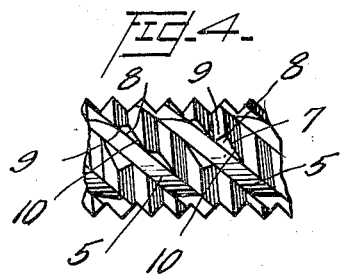
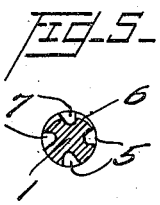
Inventor
Charles R. Williams
By Watson, Cole, Grindle & Watson
Attorney

Patented July 31, 1951

2,562,516

UNITED STATES PATENT OFFICE 2,562,516

THREADED FASTENER

Charles R. Williams, Lakewood, R. I., assignor to American Screw Company, Providence, R. I., a corporation of Rhode Island Application December 7, 1945, Serial No. 633,461

1 Claim. (Cl. 80—61)

This invention relates to self-tapping threaded fasteners and more particularly to a self-tapping screw adapted for use in connection with metals, plastics, and other materials in which previously drilled holes may be threaded or tapped in the process of driving into such holes, screws provided with so-called tapping threads or teeth.

It is the general object of the invention to provide a self-tapping threaded fastener formed in an economical and expeditious manner by rolling onto a suitable blank a multiple thread of relatively high pitch, commonly known as a drive screw thread and, in a second rolling operation superimposing upon the drive screw thread a single thread of relatively low pitch, commonly known as a machine screw thread, the result of such combined operations producing a screw whose shank is provided throughout its entire length with a machine screw thread interrupted at a plurality of points in each convolution thereof by helical grooves extending the entire length of the shank.

Another object is the provision of a self-tapping screw which, by virtue of its construction as aforesaid, is lighter in weight, and requires less material, than self-tapping screws in which one or more longitudinal grooves extend only part way of the shank.

Another object is the provision of a self-tapping screw provided with cutting teeth and chip-receiving grooves throughout its entire length, whereby the driving of the screw into an untapped hole may be accomplished with a minimum of turning effort, and whereby ample chip storage space is provided along the entire length of the screw.

Another object is the provision of a self-tapping screw provided with chip storage grooves of helical form, whereby material removed from the wall of the hole into which the screw is driven will be cammed upwardly due to the inclination of the chip storage grooves and the inclination of the cutting teeth, such material thereby being prevented from falling into the hole and forming an obstruction in the bottom thereof.

Another object is the provision of a self-tapping screw in which the cutting teeth formed at the forward ends of the interrupted thread portions are inclined rearwardly from bottom to top, relative to the direction of rotation of the screw, whereby such cutting teeth are formed with a skiving edge, greatly facilitating the tapping function.

Another object is the provision of a self-tapping screw having a symmetrical and tapered point provided with alternate grooves and lands, whereby the point of the screw serves as a reamer upon insertion into an undersized hole.

Another object is the provision of a self-tapping screw having a great multiplicity of cutting edges and a relatively small thread bearing area whereby the screw may be easily driven or removed from the work and whereby the relatively small interrupted thread portions are adapted to embed themselves in the material of the work after the screw has been driven into place, thus deterring accidental displacement of the screw through vibration or other causes.

Another object is the provision of a simple, inexpensive method of forming a self-tapping screw having the aforesaid features and advantages.

Other and further objects and advantages will be apparent from the description which follows, taken in connection with the accompanying drawings in which:

Figure 1 is an elevational view of a pre-formed blank adapted for formation into the screw of the present invention;

Figure 2 is an elevational view of the blank of Figure 1 after undergoing the first rolling operation;

Figure 3 is an elevational view of the blank of Figures 1 and 2 after undergoing the second rolling operation;

Figure 4 is an enlarged fragmentary elevation of a portion of the screw shank of Figure 3;

Figure 5 is a transverse sectional view on line 5—5 of Figure 3; and

Figure 6 is an end elevation, from the point end of the screw, of a completely threaded blank of Figure 3.

In order to facilitate an understanding of the invention, reference is made to the embodiments thereof shown in the accompanying drawings, and detailed descriptive language is employed. It will nevertheless be understood that no limitation of the invention is thereby intended and that various changes and alterations are contemplated such as would ordinarily occur to one skilled in the art to which the invention relates.

Referring to the drawings, the blank I, illustrated in Figure 1, may be made from any wire or rod material of suitable formula, and by any suitable sequence of operations, such as are well known in the screw manufacturing industry, and need not be described. While a round head blank is illustrated, the shape of the head 3, and the type of driving recess or slot (not shown) are of no significance to the present invention, and any suitable shape of head may be employed as well as any desired type of driving recess or slot. The blank is preferably formed with a tapered end 2.

The blank 1 of Figure 1 is subjected to a thread rolling operation, in which the shank of the blank is rolled between suitably formed steel dies in a thread rolling machine, which operation is well known in industry and need not be described. In the present instance the dies are so formed as to produce a multiple thread 4 of high pitch, known as a drive screw thread, and in the illustrated embodiment a quadruple thread is shown, with alternate grooves 5. The blank provided with such drive screw thread is then subjected to a second rolling operation, between dies designed to form a single thread of low pitch commonly known as a machine screw thread 6. As a result of this operation the major diameter of the previously formed drive screw thread is decreased, the crests of the drive screw thread 4 being deformed by widening and by the formation thereon of short interrupted portions of the machine screw thread 6 while the roots of the drive screw thread are not deformed.

The resulting screw is as illustrated in Figure 3 and comprises a cylindrical shank, tapered for a short distance at the point and provided with a machine screw thread 6 extending through the entire length of the shank but interrupted at four points in each convolution by virtue of the four helical grooves 5 resulting from the aforesaid sequence of operations.

Referring now to Figure 4 it will be seen that each short interrupted portion 7 of the machine screw or tapping thread is provided at its leading end with a cutting edge 8 defined by the lines 9 and 10 and the bottom of the adjacent groove 5, which cutting edge is inclined rearwardly from bottom to top, relative to the direction of rotation of the screw. Such a cutting surface is known as a skiving edge and greatly facilitates the cutting or tapping operation as compared with a vertical surface, i. e., one lying in a plane parallel to the longitudinal axis of the screw.

Since the grooves 5 extend to the end of the shank, including the tapered portion 2, the point of the screw will have a reamer action upon insertion into an undersized hole, thus facilitating the insertion of the screw and the tapping of such holes and decreasing the amount of effort required for this purpose. Moreover, by virtue of the number and size of the helical grooves 5, and the fact that they extend over the full length of the screw shank, it is obvious that an ample chip storage capacity is provided regardless of the depth of the hole into which the screw is tapped. Furthermore, by virtue of the cam action of the helical grooves upon the material removed from the walls of the hole such material is prevented from falling into the hole and forming an obstruction therein.

By virtue of the number and size of the grooves, and therefore the relatively great number of small interrupted portions of the tapping thread, it has been found that the screw is lighter in weight, and employs considerably less material, than other types of self-tapping screws of equivalent size. Moreover, the small interrupted portions of the tapping thread tend to embed themselves into the material of the work into which the screw is driven, preventing accidental displacement of the screw due to vibration or other causes. Nevertheless, because of the large number of cutting edges on the respective ends of the many small portions of the tapping thread the screw may be easily removed from the work when desired, the leading ends of the thread portions on such reverse rotation having a cutting action just as the leading ends upon clockwise rotation perform a cutting action upon driving of the screw.

From the foregoing it will appear that the stated objects of the invention are accomplished, and an efficient and economical self-tapping screw, and method of forming the same, are provided.

Having thus described the invention, what is claimed as new and desired to be secured by Letters Patent is:

Method of making a self-tapping threaded fastener comprising the steps of forming a suitable metal blank having a cylindrical shank, forming by a rolling operation a plurality of complete threads of relatively high pitch on said shank, and forming on said shank by a second rolling operation interrupted thread segments in phase with each other, of relatively low pitch in the same rotational sense, superimposed on the threads formed by said first rolling operation, whereby each thread segment has an undercut cutting edge at its leading edge, said cutting edge being inclined rearwardly substantially from bottom to top, relative to the direction of rotation.

CHARLES R. WILLIAMS.

REFERENCES CITED

The following references are of record in the file of this patent:

UNITED STATES PATENTS

| Number | Name | Date |
|---|---|---|
| 1,294,268 | Holmes | Feb. 11, 1919 |
| 1,447,700 | Wells | Mar. 6, 1923 |
| 2,232,336 | Meersteiner | Feb. 18, 1941 |
| 2,293,930 | Braendel | Aug. 25, 1942 |
| 2,314,897 | Purinton | Mar. 30, 1943 |
| 2,393,990 | Kambarian | Feb. 5, 1946 |